(12) United States Patent
Min-Seok

(10) Patent No.: US 8,111,296 B2
(45) Date of Patent: Feb. 7, 2012

(54) APPARATUS AND METHOD FOR GENERATING PANORAMA IMAGE AND COMPUTER READABLE MEDIUM STORED THEREON COMPUTER EXECUTABLE INSTRUCTIONS FOR PERFORMING THE METHOD

(75) Inventor: Kim Min-Seok, Seoul (KR)

(73) Assignee: Core Logic, Inc., Seoul (KR)

( * ) Notice: Subject to any disclaimer, the term of this patent is extended or adjusted under 35 U.S.C. 154(b) by 923 days.

(21) Appl. No.: 12/150,387

(22) Filed: Apr. 28, 2008

(65) Prior Publication Data

US 2008/0266408 A1 Oct. 30, 2008

(30) Foreign Application Priority Data

Apr. 26, 2007 (KR) .................. 10-2007-0040789

(51) Int. Cl.
*H04N 5/225* (2006.01)
*H04N 5/262* (2006.01)
*G06K 9/40* (2006.01)
(52) U.S. Cl. ............... 348/218.1; 348/239; 382/266
(58) Field of Classification Search ............ 348/218.1, 348/239, 222.1; 382/266, 267, 268, 269
See application file for complete search history.

(56) References Cited

U.S. PATENT DOCUMENTS

| 7,646,400 | B2 * | 1/2010 | Liow et al. | 348/239 |
| 2003/0234866 | A1 * | 12/2003 | Cutler | 348/207.1 |
| 2005/0063610 | A1 * | 3/2005 | Wu et al. | 382/294 |
| 2006/0153447 | A1 * | 7/2006 | Ouchi | 382/173 |

* cited by examiner

*Primary Examiner* — Nhan T Tran
(74) *Attorney, Agent, or Firm* — Edwards Wildman Palmer LLP

(57) ABSTRACT

The present invention relates to apparatus and method for generating a panorama image, and a computer readable medium stored thereon computer executable instructions for performing the method.

The apparatus for generating a panorama image according to the present invention comprises an input unit for receiving a plurality of input object images for panorama image generation; an edge detecting unit for outputting edge data of the input object images; a matching area output unit for outputting a matching area, namely, a standard area for pattern matching, within the edge data; a pattern matching unit for matching patterns of a plurality of the object images based on the matching area; and a stitching unit for generating a plurality of the object images into a panorama image based on the matched patterns.

21 Claims, 7 Drawing Sheets

(a)  (b)

(a)            (b)            (c)

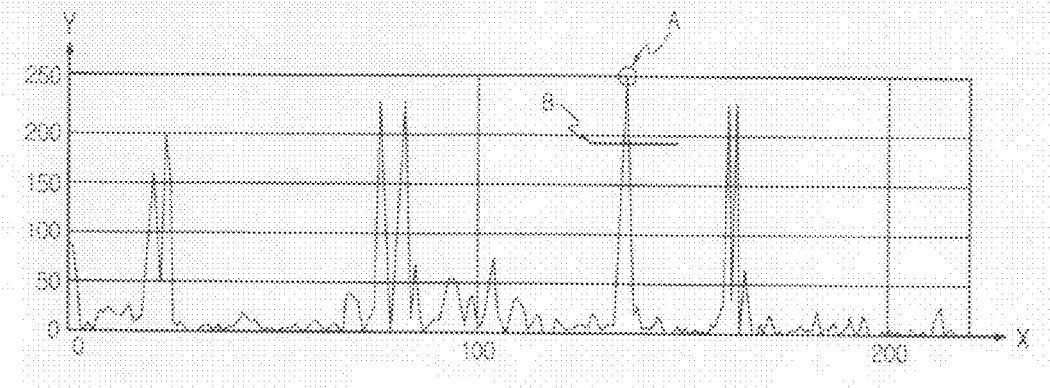
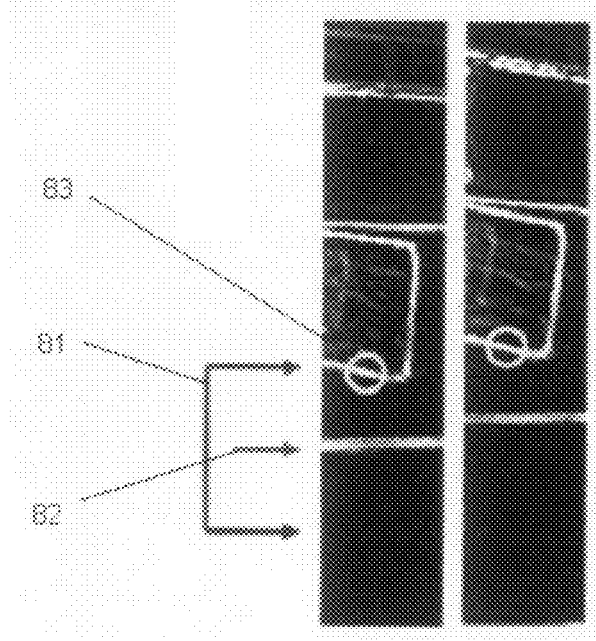

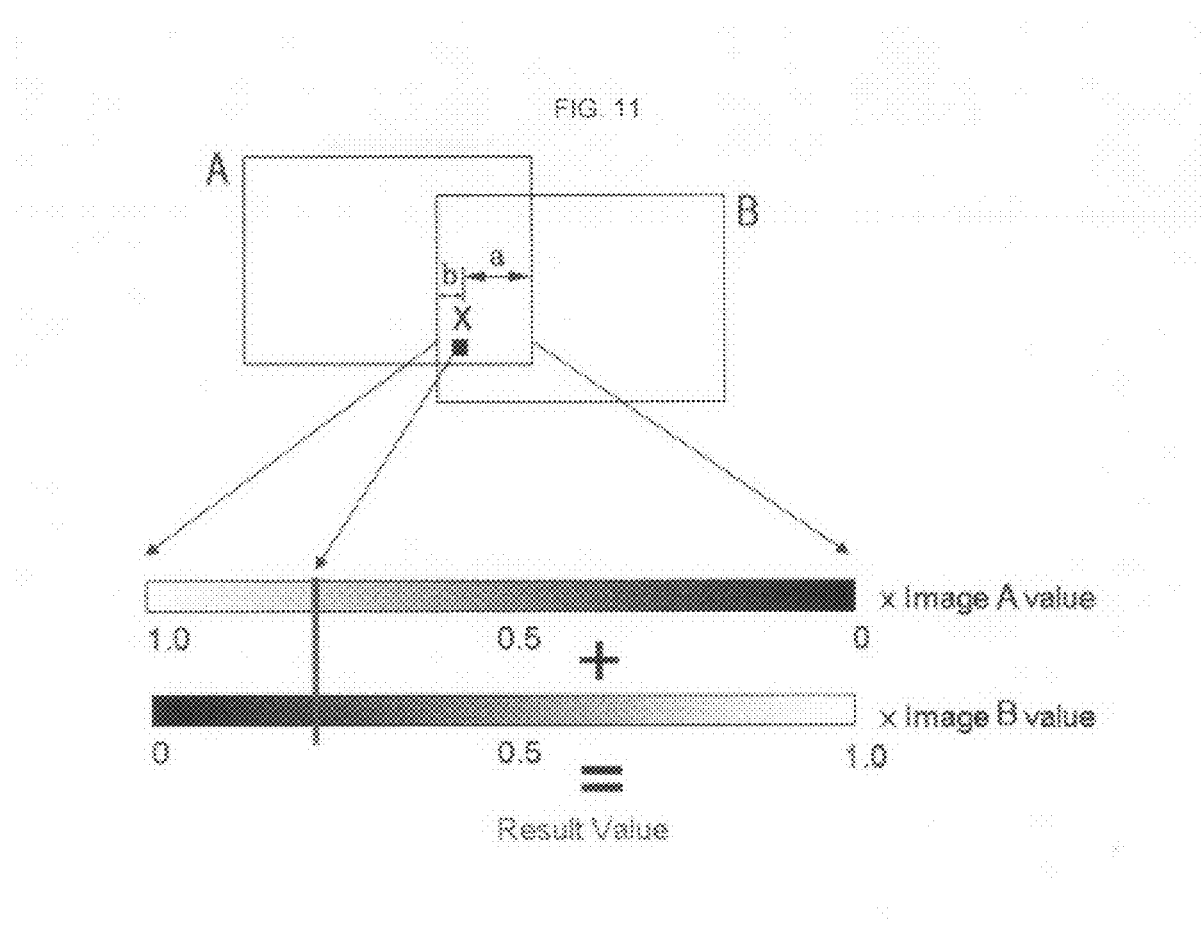

APPARATUS AND METHOD FOR GENERATING PANORAMA IMAGE AND COMPUTER READABLE MEDIUM STORED THEREON COMPUTER EXECUTABLE INSTRUCTIONS FOR PERFORMING THE METHOD

CLAIM OF PRIORITY

This application claims priority under 35 USC §119(a) to Korean Patent Application No. 10-2007-0040789, filed on Apr. 26, 2007, in the Korean Intellectual Property Office, the entire contents of which are hereby incorporated by reference.

TECHNICAL FIELD

The present invention relates to apparatus and method for generating a panorama image using an image combination technique, and in particular, to apparatus and method for generating a panorama image on the basis of statistical characteristics of object images for panorama image generation and distinctive characteristics of the object images based on the statistical characteristics.

BACKGROUND

In the modern society, photography trends move from image generation by conventional film-type photography apparatus and method using an SLR (Single-Lens-Reflex) camera to digital image generation using an optical sensor such as CCD (Charged Coupled Device) or CMOS (Complementary Metal Oxide Semiconductor).

With expansion of enjoyment of culture and the scope of activity of modern people, photography using the digital optical device is increasingly used, and various supplementary photography devices or digital image processors are developed accordingly.

Basically, the film-type or digital image apparatus produces an optical information that is inputted through an optical device, such as a lens, a diaphragm or a shutter, on a film, or converts the optical information into an electric energy by the optical device thereby to generate an image. Accordingly, the generated image has limitations in field of view depending on the angle of the lens toward a subject.

Various lens groups are developed according to purposes of use, and thus the lens has a wide range of applications. However, the lens still has the limitations in field of view due to its physical characteristics.

Generally, a panorama image was created for the purpose of overcoming the above-mentioned physical limitations to satisfy the various growing desires of users utilizing digital images. The panorama image means an image with an extended field of view of a subject seen in a camera lens through a camera technique, change of the focus of the camera lens or digital image processing.

That is, a plurality of images may be combined horizontally, vertically and in a combination of horizontal and vertical to generate a single image with a wide and large field of view, which is referred to as a panorama image.

Conventional methods for generating the panorama image includes generating a plurality of images using a plurality of cameras located at various angles, or adjusting physically the angle of a camera lens toward a subject in an imaging apparatus to generate angle-adjusted images, and then combining the generated images into a panorama image.

The above-mentioned apparatus or method requires an additional equipment, is much influenced by an objective factor such as a manipulation method of users, and goes against the recent trends of a terminal toward mobility and miniaturization.

In addition, a method for combining a plurality of images by digital image processing was suggested. However, this method should experience a complex and complicated process through a specific program stored in PC (Personal Computer). Further, a step for matching a plurality of the images has an intrinsic problem such as complexity or inaccuracy, and thus has a difficult in generating a panorama image easily and simply.

That is, there are still the demands for a method for combining images easily and simply in a portable imaging apparatus to generate an accurate panorama image.

SUMMARY

The present invention was devised to solve the above-mentioned problems. An object of the present invention is to provide apparatus and method for generating a panorama image easily and accurately on the basis of a statistical calculation value of object images for panorama image generation and distinctive characteristics of the object images based on the statistical calculation value.

And, another object of the present invention is to provide a computer readable medium stored thereon computer executable instructions for performing the method.

These and other features, aspects, and advantages of the present invention will be more fully described in the preferred embodiments of the present invention. And, the objects and advantages of the present invention can be implemented by configurations recited in the claims singularly or in combination.

To achieve the above-mentioned objects, an apparatus for generating a panorama image, comprises an input unit for receiving input of a plurality of object images for panorama image generation; an edge detecting unit for outputting edge data, namely, data about edge areas of the input object images; a matching area output unit for outputting a matching area, namely, a standard area for pattern matching, among the edge data; a pattern matching unit for matching patterns of a plurality of the object images based on the matching area; and a stitching unit for generating a plurality of the object images into a panorama image based on the matched patterns.

Through the above-mentioned configuration, the apparatus for generating a panorama image can generate an accurate panorama image with the edge data of the images and the pattern matching area based on the edge data.

Preferably, the edge detecting unit outputs an edge data of an edge image data corresponding to 20% or less of each object image for panorama image generation. Thus, the apparatus for generating a panorama image can reflect an actually combined area and improve the calculation speed.

And, preferably, the matching area output unit includes a first output unit for outputting a first data for each line of the edge data, namely, a statistical average value of brightness information of each pixel corresponding to one line of the edge data; a peak output unit for outputting a peak data corresponding to a peak area among the first data; and a second output unit for outputting a matching area based on lines corresponding to the peak data.

Through the above-mentioned configuration, a matching device may be incorporated, which conforms itself to characteristics of an image through the statistical calculation value of brightness information of the object images.

The second output unit may output a line area corresponding to a maximum peak data among the peak data as the matching area, or the second output unit may output, as the matching area, an area having a maximum dispersion value of the first data of a predetermined area including the peak data among lines corresponding to the peak data.

Further, the pattern matching unit fixes the location of a standard image among the object images and moves the locations of comparative images, namely, images other than the standard image to match a plurality of the object images based on the matching area. The pattern matching unit matches the patterns of the object images on the basis of a coordinate having the most counting number of sums of brightness information of a pixel value of each object image according to movement locations in the case of the sum is a predetermined standard or more. Preferably, the predetermined standard is set as a value of 80% or more of brightness information corresponding to the used peak data.

Through the above-mentioned configuration, the apparatus for generating a panorama image can reflect characteristics of an image to allow the most accurate matching when matching the patterns of the object images.

Further, preferably, the pattern matching unit further includes a matching condition setting unit for receiving the setting of at least one condition data selected from the group consisting of data about a size of a location movement area of the comparative image, data about a unit movement interval of the comparative image, and data about a calculation interval of an object pixel for the sum of brightness information, and the pattern matching unit matches the patterns of the object images based on the condition data set in the matching condition setting unit.

Through the above-mentioned configuration, the apparatus for generating a panorama image can adjust the speed or accuracy of calculation necessary for image combination depending on a user environment through the condition data.

Meanwhile, the stitching unit applies a weight value to image information of each pixel of the object images, the weight value being added differentially according to spaced distances between a pixel of an overlapped portion of the object images resulted from the pattern matching and the object images, and generates the sum of result values as image information of the panorama image. At this time, the sum of the added weight values is '1'.

Through the above-mentioned configuration, the apparatus for generating a panorama image can generate a panorama image having image information in a natural harmony with a plurality of the object images.

Meanwhile, to achieve the above-mentioned objects, a method for generating a panorama image, comprises an input step for receiving input of a plurality of object images for panorama image generation; an edge detecting step for outputting edge data, namely, data about edge areas of the input object images; a matching area output step for outputting a matching area, namely, a standard area for pattern matching, among the edge data; a pattern matching step for matching patterns of a plurality of the object images based on the matching area; and a stitching step for generating a plurality of the object images into a panorama image based on the matched patterns.

Through the above-mentioned configuration, the method for generating a panorama image can generate a panorama image simply and accurately based on characteristics of an image.

BRIEF DESCRIPTION OF THE DRAWINGS

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

FIG. 7 is a graph illustrating a standard for brightness information of a peak data as a matching standard of the panorama image.

FIG. 8 is a view illustrating a matching area as a standard for pattern matching.

FIG. 11 is a view illustrating a multiplication calculation of a weight value added to each image when generating the panorama image.

DETAILED DESCRIPTION

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Prior to the detailed description of the present invention, terms or definition necessary to understand the present invention are described.

Generally, a color space of an image essential to image processing may be expressed variously, for example RGB (Red, Green, Blue), CMYK (Cyan, Magenta, Yellow, Key (Black)), HS-family, CIE (The Commission Internationale d'Eclairage) or Y-family, depending on point of view such as view toward color mixture or similarity to a visual system of human beings, and one kind of color space may be converted to another kind of color space by a simple mathematical conversion formula.

And, an input image includes a plurality of pixels, and each pixel has its unique image information (brightness, hue, saturation and so on). Generally, the image information has values of 0 to 255, and is indicated as data of 8 bit. However, in alternative embodiments, the image information may be indicated as data of 10 bit or 12 bit depending on application conditions.

Therefore, it should be understood that another color space coordinate system may be applicable equally or similarly to a color space coordinate system used as an example in the present invention, and a bit size of an image information of a pixel in the input image is just an example of the present invention for description.

Figure 1:
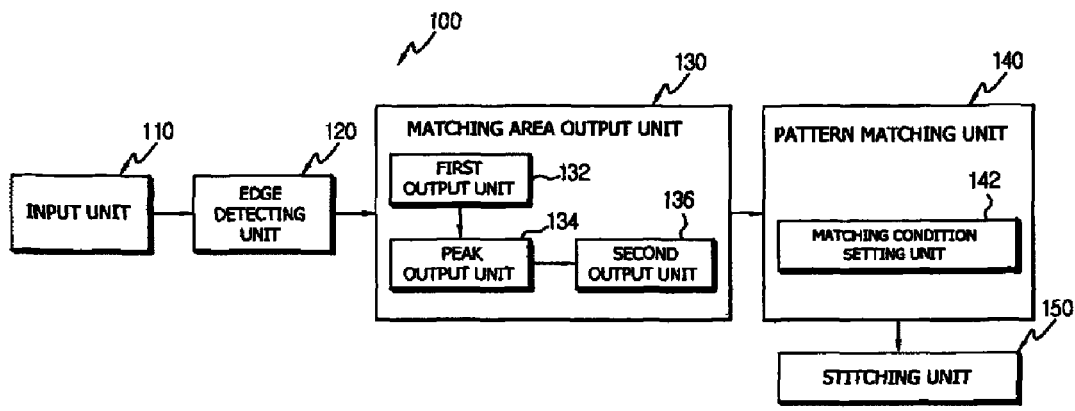
FIG. 1 is a block diagram illustrating an apparatus for generating a panorama image according to a preferred embodiment of the present invention.
Figure 2:
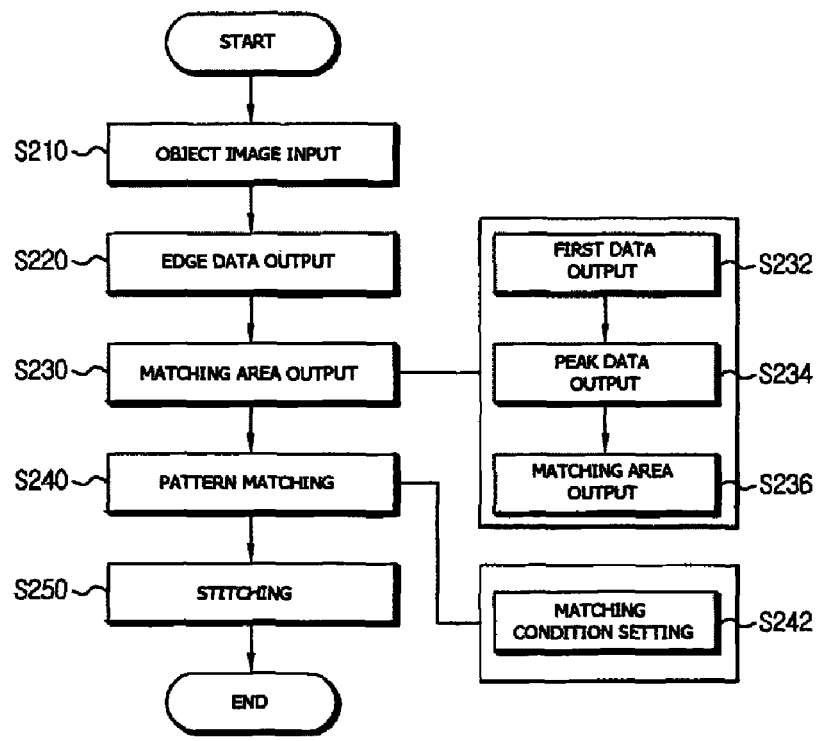
FIG. 2 is a flow chart illustrating a method for generating a panorama image according to a preferred embodiment of the present invention.

FIG. 1 is a block diagram illustrating an apparatus for generating a panorama image according to a preferred embodiment of the present invention, and FIG. 2 is a flow chart illustrating a method for generating a panorama image according to a preferred embodiment of the present invention.

Referring to FIGS. 1 and 2, the apparatus 100 for generating a panorama image according to the present invention comprises an input unit 110, an edge detecting unit 120, a matching area output unit 130, a pattern matching unit 140, and a stitching unit 150.

First, the input unit 110 receives input of a plurality of object images for panorama image generation (S210). The object images may be inputted by a user for combination. Generally, the input unit 110 receives input of object images for horizontal panorama image generation, vertical panorama image generation or a combination (2×2, 3×3 and so on) of horizontal panorama image generation and vertical panorama image generation.

The scope of the present invention is not limited by the embodiment shown below involving two object images for vertical panorama image generation.

The edge detecting unit 120 outputs an edge data, namely, data about an edge area of the input object image (S220). The edge data means data about silhouette or outline, contour or edge of a subject in the object image. When the object images are combined, characteristics of an image are seen more prominently at an edge portion than other portions of the subject, and for this reason, the edge data is outputted.

To output the edge data, a second-order differential laplacian may be used, which may produce undesirable results caused by noise. Preferably, a first-order differential gradient is used.

Various other methods can be used to output the edge data. For example, a Robert mask, a Prewitt mask or a Sobel mask may be used. Due to characteristics of an image, it is preferable to use a Sobel mask, in particular a 3×3 Sobel mask as shown in the following Table 1, in aspect of calculation speed or efficiency. In the Table 1, a left mask is a horizontal edge filter, and a right mask is a vertical edge filter.

TABLE 1

| -1 | -2 | -1 | -1 | 0 | 1 |
|---|---|---|---|---|---|
| 0 | 0 | 0 | -2 | 0 | 2 |
| 1 | 2 | 1 | -1 | 0 | 1 |
| (a) | | | (b) | | |

Figure 3:
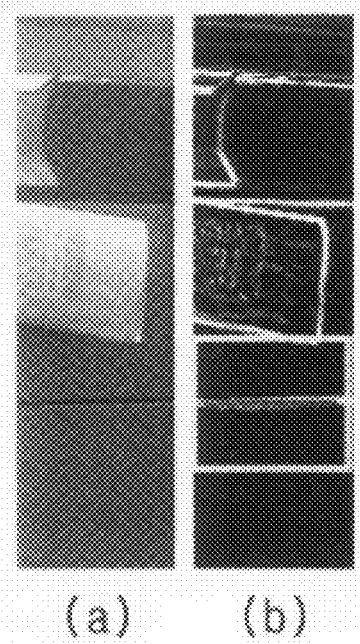
FIG. 3 is a view illustrating a portion of input image and an edge data of the portion of input image according to an embodiment of the present invention.

FIG. 3 is a view illustrating a portion of an input image and an edge data of the portion of input image according to an embodiment of the present invention, wherein a left image (a) is the input image, and a right image (b) is an image data having the edge data outputted through a 3×3 Sobel mask.

In FIG. 3, the input image is an object image for combination, and the edge data means an edge data of an edge image data corresponding to 20% or less of the input object image.

In the case of horizontal panorama image generation, generally a first image is combined with a second image while the second image is arranged at the right side of the first image. In consideration of general characteristics of a panorama image, it is preferable to output an edge data of an edge image data corresponding to 20% or less of each object image, thereby reflecting a substantial area of image combination and improving the calculation processing efficiency.

In the case of vertical panorama image generation, a combined edge of a lower image is an upper edge, and a combined edge of an upper image is a lower edge. In the case of a combination of horizontal and vertical panorama image generation, for example 2×2, combined edges of object images are left, right, upper and lower edges.

After the edge data is outputted as mentioned above, the matching area output unit 130 outputs a matching area, namely, a standard area for pattern matching among the edge data (S230). That is, the matching area output unit 130 outputs an area corresponding to the most prominent edge among the outputted edge data, as a matching area, i.e. a standard for matching. Through the above-mentioned configuration, a portion having distinctive characteristics among the edge data is selected as the matching area, and the object images are matched on the basis of the matching area, thereby resulting in an accurate matching process.

Specifically, the matching area output unit 130 includes a first output unit 132, a peak output unit 134, and a second output unit 136.

The first output unit 132 outputs a first data for each line of the edge data, namely, a statistical average value of brightness information of pixels corresponding to one line of the edge data (S232).

Generally, brightness information of a pixel corresponds to Y among image information known as a color space, and thus the first data may be referred to as a Y profile in the present invention. Because the first data (Y profile) is a statistical average value of brightness information of pixels corresponding to one line of the edge data as mentioned above, in the case that the object image has 320×240 size, a statistical average value for each of 240 lines is outputted.

Figure 4:
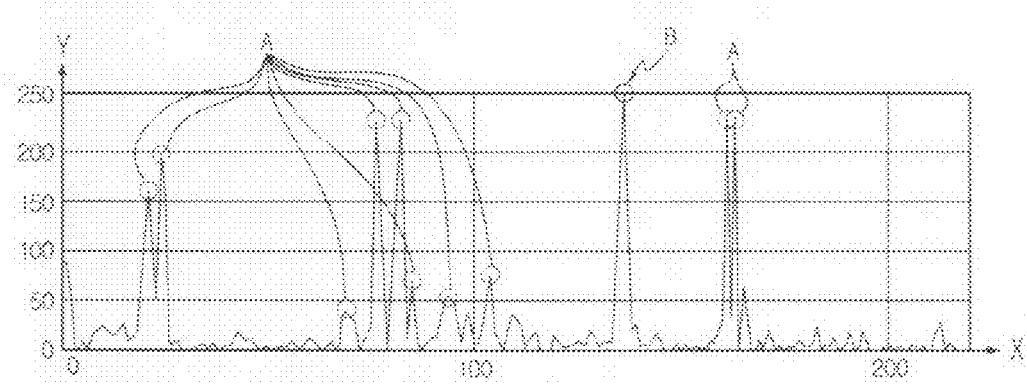
FIG. 4 is a graph illustrating a first data, namely, a statistical average value of brightness information of edge data for each line.

FIG. 4 is a graph illustrating the first data, namely, a statistical average value of brightness information for each line of the edge data, and shows a coordinate system of the statistical calculation value (average value) of brightness information for each line, ranging from a first line to the last line.

In other words, FIG. 4 is a view illustrating a (x,y) coordinate system that displays the first data, i.e. the result values in two dimensions and reflects characteristics for each line of the object image, wherein an x-axis indicates lines of the object image (a higher line to a lower line with regard to the origin) and a y-axis indicates the statistical calculation value (first data), and the coordinate system is formed by rotating the statistical calculation value of brightness information for each line of the input object image.

After the first data is outputted as mentioned above, the peak output unit 134 outputs a peak data corresponding to a peak area among the first data (S234).

The peak data is a portion exhibiting the most prominent image characteristics among the edge data. Therefore, in the case that the object images are matched on the basis of the peak data, a more accurate matching efficiency can be created.

The peak data is obtained by comparing first data values of adjacent lines with each other, and outputting a result value judged on the basis of breakpoints where the direction of the first data values turns from ascending to descending.

Finally, the second output unit 136 outputs the matching area using lines corresponding to the peak data (S236). As shown in FIG. 4, the lines corresponding to the peak data have peaks indicated as circles (A, B), and are used to output the matching area, namely, a standard area for pattern matching.

At this time, the second output unit 136 may output a line area corresponding to a highest peak data among the peak data, as the matching area.

In FIG. 4, a portion indicated as B is the highest peak data, and a line area corresponding to the highest peak data consists of brightest information in the image. Therefore, in the case that the line area corresponding to the highest peak data is outputted as the matching area, the matching efficiency can be maximized.

And, the second output unit 136 may output, as the matching area, a predetermined area having a maximum dispersion value of a first data of a predetermined area including the peak data among the lines corresponding to the peak data.

Figure 5:
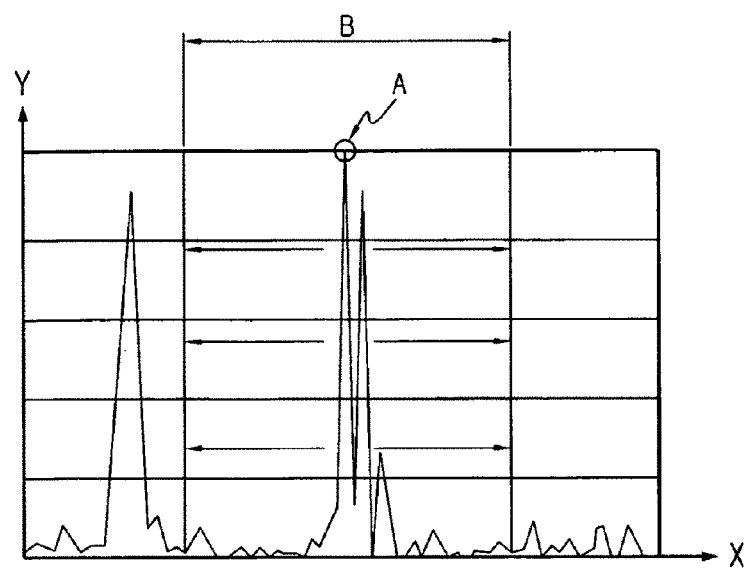
FIG. 5 is a graph illustrating a portion of the first data, where a matching area is outputted on the basis of a dispersion value.

FIG. 5 is a graph illustrating a portion of the first data, where the matching area is outputted on the basis of a dispersion value. In the statistical viewpoint of average and dispersion of function values of the lines corresponding to the first data, including the peak data, a large dispersion value of a predetermined area means a very irregular dispersion of function values, consequently the predetermined area has distinctive characteristics from other areas. Therefore, in the case that the matching area is selected on the basis of the statistical characteristics, a more accurate image combination method can be realized.

In other words, a predetermined area having a maximum dispersion value, including the peak data (A of FIG. 5), among the lines corresponding to the peak data is outputted as the matching area (B of FIG. 5), namely, a standard for matching. Through the above-mentioned configuration, an area having statistical distinctive characteristics, on which characteristics of the image are reflected, is outputted as the matching area, namely, a standard for matching. Accordingly, distinctive characteristics of each image are reflected on the matching process, and thus a more accurate matching point can be used.

FIG. 8 is a view illustrating the matching area, namely, a standard for pattern matching, and shows matching area indicated by the arrows (81) and the line corresponding to a peak data indicated by an arrow (82).

After the above-mentioned step is completed, the pattern matching unit 140 matches the patterns of a plurality of the object images on the basis of the matching area (S240). In practice, the object areas for panorama image generation are matched horizontally, vertically or in a combination of horizontal and vertical on the basis of the matching area outputted in the above-mentioned step.

The pattern matching step (S240) by the pattern matching unit 140 is also performed by moving the locations of a plurality of the object image. For example, the pattern matching unit 140 fixes the location of a standard image among the object images and moves the location of comparative images, namely, object images other than the standard image thereby to match the patterns of a plurality of the object images based on the matching area. The pattern matching unit 140 may match the patterns of the object images based on a coordinate having the most counting number in the case that the sum of brightness information of a pixel value of each object image according to movement location is a predetermined standard or more.

Figure 9:
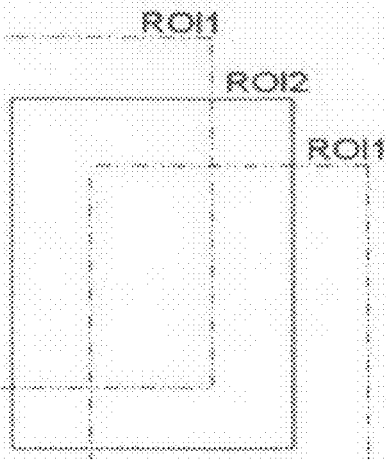
FIG. 9 is a view illustrating a pattern matching step.
Figure 10:
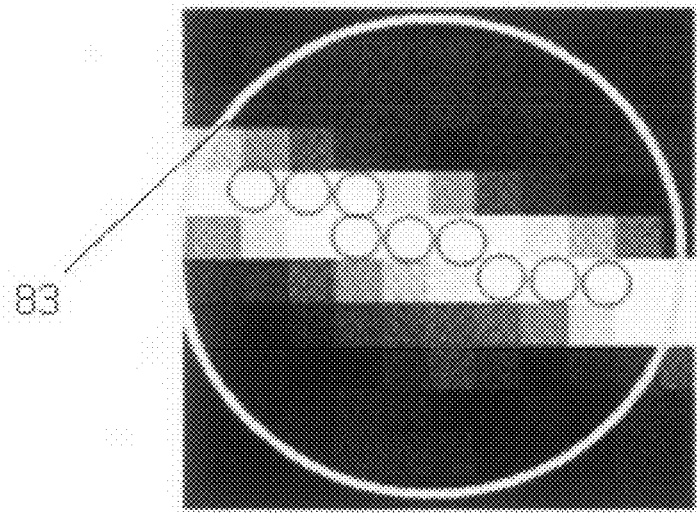
FIG. 10 is a view illustrating a step for searching a matching point of a specific critical value or more.

The standard image and the comparative image should be viewed as a relative concept, not as an absolute concept. FIG. 9 is a view illustrating the pattern matching step. FIG. 10 is a view illustrating a step for searching a matching point of a specific critical value or more. In describing the pattern matching step with reference to FIG. 9 and FIG. 10, first, the location of an image (standard image) is fixed. In FIG. 9, ROI2 (Region Of Interest) is a standard image, and ROI1 is a comparative image.

The pattern matching is performed while moving the comparative image horizontally and vertically, the brightness information of the comparative image and the standard image is outputted each coordinate according to movement location, and the outputted brightness information is stored in association with the coordinate.

In other words, the sum of brightness information of a pixel value of each object image is calculated whenever the comparative image is moved, and the number of sums in the case that the sum is a predetermined standard or more is counted. The counting number is calculated each movement location as mentioned above, and a movement location having the most counting number means that the pattern matching was made best between the object images at the location. That is, the object images are combined on the basis of a coordinate point corresponding to the movement location having the most counting number to generate a panorama image.

FIG. 10 is a view illustrating a step for calculating the sum of brightness information of a corresponding pixel value, and a circle (83) of FIG. 10 corresponds to the circle (83) of FIG. 8.

The predetermined standard is for judging the number of the sum of brightness information, and may have various variations or modifications according to apparatus or image characteristics. In the present invention, the most preferable predetermined standard is a value corresponding to 80% or more (B) of brightness information of the peak data (A) as shown in FIG. 7, based on an actual experimental example or a detection rate.

And, the pattern matching unit 140 further includes a matching condition setting unit 142 for receiving the setting of any one condition data selected from the group consisting of data about a size of a location movement area of the comparative image, data about a unit movement interval of the comparative image, and data about a calculation interval of an object pixel for the sum of brightness information. Preferably, the pattern matching unit 140 matches the patterns of the object images based on the condition data set by the matching condition setting unit 142. Similarly, the pattern matching step (S240) further includes a matching condition setting step (S242) performed by the matching condition setting unit 142.

Figure 6:
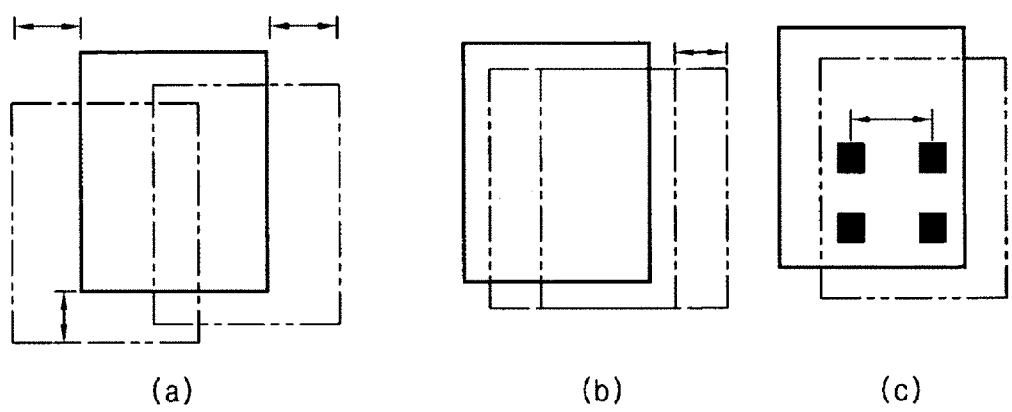
FIG. 6 is a view illustrating matching conditions of a standard image and a comparative image according to a preferred embodiment of the present invention.

FIG. 6 is a view illustrating the matching conditions of the standard image and the comparative image according to a preferred embodiment of the present invention. FIG. 6(*a*) shows a condition limiting the entire search range of ROI1. FIG. 6(*b*) shows data about a calculation interval of an object pixel for the sum of brightness information, i.e. data about a movement interval when the comparative image is moved while searching the range. FIG. 6(*c*) shows data about an interval between a pixel of the standard image and a pixel of the comparative image when calculating the brightness information.

In the pattern matching of the object images, it is preferable to sufficiently reflect the system environment such as embodiment, specification of an apparatus or definition of the object image, and selectively combine and apply the conditions for pattern matching as shown in FIG. 6 (*a*), (*b*) and (*c*), so that the system environment can be reflected more effectively.

After the pattern matching is completed through the above-mentioned step, finally, the stitching unit 150 generates a plurality of the object images into a single panorama image (S250).

For a more natural image information of the panorama image, the stitching unit 150 multiplies an image information of each pixel of the object images by a weight value that is added differentially according to spaced distances between a pixel of an overlapped portion of the object images resulted from the pattern matching and the object images, and generates the sum of result values as image information of the panorama image. Preferably, the sum of the added weight values is '1'.

As shown in FIG. 11, a weight value added differentially according to spaced distances (a, b) between an object pixel (x) and the images (A, B) is applied to image information of a pixel of each image, and the sum of the calculated values is generated as image information of a corresponding pixel of a panorama image. Accordingly, a plurality of the images are combined with each other in a natural harmony.

As mentioned above, a weight value added differentially according to spaced distances is applied to each image, thereby creating a natural association effect. However, in the case that the sum of weight values is not '1', it may exceed the numeric range expressible depending on a value of image information, and in this case, another processing is required. Therefore, it is preferable that the sum of weight values is '1'.

For a specific example, in the case that a spaced distance between a pixel of the overlapped portion and a first image is 10 and a spaced distance between the pixel and a second image is 40, a weight value is added according to the spaced distance. Since a distance ratio is 1:4, a weight value of 0.2 is added to image information of a pixel of the first image, and a weight value of 0.8 is added to image information of a pixel of the second image. The sum of the added values is outputted as a value of an object pixel of the panorama image.

The image information is not limited to brightness information as mentioned above, and the weight value may be applied to various image information represented as color spaces.

And, preferably, a portion other than the overlapped portion of an image has image information of the image, and an edge portion other than the overlapped portion of the image is cut out when it is outputted, which is preferable in aspect of a visual recognition of a user.

Figure 12A:
FIGS. 12a and 12b are views illustrating panorama images generated by the apparatus and method for generating a panorama image of the present invention.
Figure 12B:
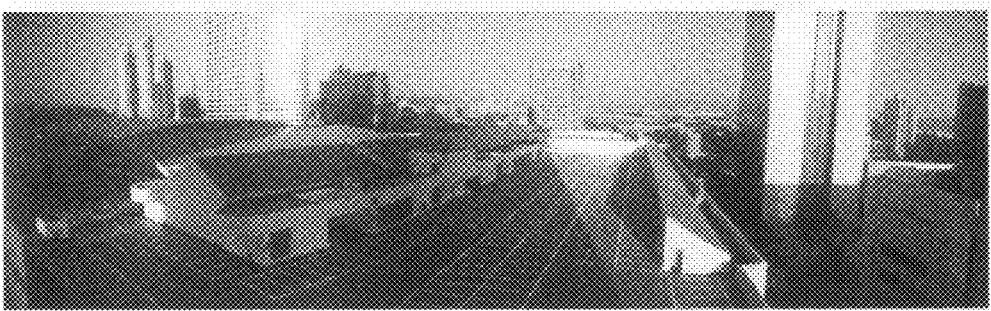

FIG. 12 is a view illustrating panorama images generated by the apparatus and method for generating a panorama image according to the present invention.

The method for generating a panorama image according to the present invention may be incorporated as a computer readable code in a computer readable medium. The computer readable medium includes all kinds of storage devices for storing data readable by a computer system. For example, the computer readable medium is ROM, RAM, CD-ROM, a magnetic tape, a floppy disc or an optical data storage device, and may be incorporated in the form of a carrier wave (for example, transmission via the Internet). And, the computer readable medium may store and execute a code that is dispersed in computer systems connected to each other via a network and is readable by a computer through a dispersion method. Further, function program, code and code segments for implementing the method for reducing image noise with filter matrix may be easily inferred by programmers in the prior art.

Only a few implementations and examples are described and other implementations, enhancements and variations can be made based on what is described and illustrated in this application.

The present invention provides apparatus and method for generating a panorama image, in which images are matched and stitched based on statistical characteristics expressed in the images, thereby generating a more accurate panorama image.

And, the present invention does not refer to all pixel values of object images when performing a pattern matching, but forms a matching area with reference to characteristics of object images, i.e. a statistical calculation value and combines the object images based on the matching area to generate a panorama image. Therefore, the present invention provides a method for generating a panorama image, which uses a simple process and a small resource and thus is suitable for a hardware environment of a mobile phone.

Further, the present invention provides a user-friendly method for generating a panorama image, in which various conditions for panorama image generation can be set individually according to the demand of users and specification of devices.

What is claimed is:

1. An apparatus for generating a panorama image, comprising:
   an input unit for receiving a plurality of input object images for panorama image generation;
   an edge detecting unit for outputting edge data of the input object images;
   a matching area output unit for selecting a matching area within the edge data, wherein the matching area output unit further comprises a first output unit for outputting a first data for each line of edge data where the first data is an average value of brightness information of pixels over a corresponding line of edge data;
   a pattern matching unit for matching patterns of a plurality of the object images based on the matching area; and
   a stitching unit for stitching a plurality of the object images into a panorama image based on the matched patterns.

2. The apparatus for generating a panorama image according to claim 1, wherein the edge detecting unit outputs an edge data corresponding to 20% or less of each input object image.

3. The apparatus for generating a panorama image according to claim 1, wherein the edge detecting unit outputs the edge data using a 3×3 Sobel mask.

4. The apparatus for generating a panorama image according to claim 1, wherein the matching area output unit comprises:
   a peak output unit for outputting a peak data corresponding to the peaks in the first data; and
   a second output unit for selecting the matching area based on the lines corresponding to the peak data.

5. The apparatus for generating a panorama image according to claim 4, wherein the second output unit selects the matching area based on a line corresponding to a maximum peak data.

6. The apparatus for generating a panorama image according to claim 4, wherein the second output unit selects the matching area based on a line corresponding to a peak data with a maximum dispersion value of the first data where the dispersion value is calculated over a predetermined area.

7. The apparatus for generating a panorama image according to claim 1, wherein the pattern matching unit matches the patterns of a plurality of the object images by:
    moving object images relative to a fixed object image;
    summing the brightness information of each pixel over a calculation interval; and
    selecting a coordinate having the most number of sums that exceed a predetermined value of brightness.

8. The apparatus for generating a panorama image according to claim 4, wherein the pattern matching unit matches the patterns of a plurality of the object images by:
    moving object images relative to a fixed object image;
    summing the brightness information of each pixel over a calculation interval; and
    selecting a coordinate having the most number of sums that exceed a predetermined value of brightness;
    wherein the predetermined value of brightness is 80% or more of brightness information of the peak data used to select the matching area.

9. The apparatus for generating a panorama image according to claim 7, wherein the pattern matching unit further includes a matching condition setting unit for setting at least one condition data selected from the group comprising:
    a size of a location movement area of the object image; a unit movement interval of the object image; and
    a calculation interval of an object pixel for the sum of brightness information;
    wherein the pattern matching unit matches the patterns of the object images based on the condition data set in the matching condition setting unit.

10. The apparatus for generating a panorama image according to claim 1, wherein the stitching unit stitches the object images by:
    determining a weight value for each pixel of each object image in an overlapping area of the images such that the sum of the weight values for any given overlapping pixels preferably equals 1, and each weight value is determined according to the distance between the pixel and the edge of the overlapping area;
    applying the corresponding weight value to an image information of each pixel to obtain a result value; and
    summing the result values of each overlapping pixel as an image information of the panorama image.

11. A method for generating a panorama image comprising:
    an input step for receiving a plurality of input object images for panorama image generation;
    an edge detecting step for outputting edge data of the input object images;
    a matching area output step for selecting a matching area within the edge data; wherein the matching area output unit further comprises a first output unit for outputting a first data for each line of edge data where the first data is an average value of brightness information of pixels over a corresponding line of edge data;
    a pattern matching step for matching patterns of a plurality of the object images based on the matching area; and
    a stitching step for stitching a plurality of the object images into a panorama image based on the matched patterns.

12. The method for generating a panorama image according to claim 11, wherein the edge detecting step outputs an edge data corresponding to 20% or less of each input object image.

13. The method for generating a panorama image according to claim 11, wherein the edge detecting step outputs the edge data using a 3×3 Sobel mask.

14. The method for generating a panorama image according to claim 11, wherein the matching area output step comprises:
    a peak output step for outputting a peak data corresponding to the peaks in the first data; and
    a second output step for selecting the matching area based on the lines corresponding to the peak data.

15. The method for generating a panorama image according to claim 14, wherein the second output step selects the matching area based on a line corresponding to a maximum peak data.

16. The method for generating a panorama image according to claim 14,
    wherein the second output step selects the matching area based on a line corresponding to a peak data with a maximum dispersion value of the first data where a dispersion value is calculated over a predetermined area.

17. The method for generating a panorama image according to claim 11, wherein the pattern matching step matches the patterns of a plurality of the object images by:
    moving object images relative to a fixed object image;
    summing the brightness information of each pixel over a calculation interval; and
    selecting a coordinate having the most number of sums that exceed a predetermined value of brightness.

18. The method for generating a panorama image according to claim 14, wherein the pattern matching step matches the patterns of a plurality of the object images by:
    moving object images relative to a fixed object image;
    summing the brightness information of each pixel over a calculation interval; and
    selecting a coordinate having the most number of sums that exceed a predetermined value of brightness;
    wherein the predetermined value of brightness is 80% or more of brightness information of the peak data used to select the matching area.

19. The method for generating a panorama image according to claim 17, wherein the pattern matching step further includes a matching condition setting step for setting at least one condition data selected from the group comprising:
    a size of a location movement area of the object image; a unit movement interval of the object image; and
    a calculation interval of an object pixel for the sum of brightness information;
    wherein the pattern matching step matches the patterns of the object images based on the condition data set in the matching condition setting unit.

20. The method for generating a panorama image according to claim 11, wherein the stitching step stitches the object images by:
    determining a weight value of each pixel of each object image in an overlapping area of the images such that the sum of the weight values for any given overlapping pixels equals preferably 1, and each weight value is determined according to the distance between the pixel and the edge of the overlapping area;
    applying the corresponding weight value to an image information of each pixel to obtain a result value; and
    summing the result values of each overlapping pixel as an image information of the panorama image.

21. A non-transitory computer readable medium stored thereon computer executable instructions for performing a method, the method comprising:
    an input step for receiving a plurality of input object images for panorama image generation;
    an edge detecting step for outputting edge data of the input object images;

a matching area output step for selecting a matching area within the edge data; wherein the matching area output unit further comprises a first output unit for outputting a first data for each line of edge data where the first data is an average value of brightness information of pixels over a corresponding line of edge data;

a pattern matching step for matching patterns of a plurality of the object images based on the matching area; and a stitching step for stitching a plurality of the object images into a panorama image based on the matched patterns.

* * * * *